(12) United States Patent
Lindroos et al.

(10) Patent No.: US 9,081,492 B2
(45) Date of Patent: Jul. 14, 2015

(54) APPARATUS, METHOD, COMPUTER PROGRAM AND USER INTERFACE

(75) Inventors: Sanna Lindroos, Tampere (FI); Sanna Maria Koskinen, Tampere (FI); Heli Jarventie-Ahonen, Tampere (FI); Maria E. Paananen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 1207 days.

(21) Appl. No.: 12/456,393

(22) Filed: Jun. 15, 2009

(65) Prior Publication Data

US 2010/0315346 A1 Dec. 16, 2010

(51) Int. Cl.
*G06F 3/041* (2006.01)
*G06F 3/0488* (2013.01)

(52) U.S. Cl.
CPC .. *G06F 3/04883* (2013.01); *G06F 2203/04808* (2013.01)

(58) Field of Classification Search
CPC .................. G06F 3/04883; G06F 2203/04808
See application file for complete search history.

(56) References Cited

U.S. PATENT DOCUMENTS

| | | | | |
|---|---|---|---|---|
| 4,914,624 A * | 4/1990 | Dunthorn | ...................... | 345/173 |
| 8,407,606 B1 * | 3/2013 | Davidson et al. | .............. | 715/754 |
| 8,473,862 B1 * | 6/2013 | Davidson | ...................... | 715/790 |
| 8,560,020 B2 * | 10/2013 | Lee | ................ | 455/566 |
| 2002/0191029 A1 * | 12/2002 | Gillespie et al. | .............. | 345/810 |
| 2005/0253817 A1 * | 11/2005 | Rytivaara et al. | .............. | 345/173 |
| 2007/0150826 A1 * | 6/2007 | Anzures et al. | ................ | 715/772 |
| 2007/0247435 A1 * | 10/2007 | Benko et al. | ................... | 345/173 |
| 2008/0165255 A1 * | 7/2008 | Christie et al. | ............ | 348/207.99 |
| 2008/0168403 A1 * | 7/2008 | Westerman et al. | ........... | 715/863 |
| 2008/0195961 A1 | 8/2008 | Bae et al. | ....................... | 715/769 |
| 2008/0259045 A1 * | 10/2008 | Kim et al. | ..................... | 345/173 |
| 2009/0006991 A1 * | 1/2009 | Lindberg et al. | .............. | 715/763 |
| 2009/0094562 A1 * | 4/2009 | Jeong et al. | .................... | 715/863 |
| 2009/0109187 A1 * | 4/2009 | Noma | ............................ | 345/173 |
| 2009/0289916 A1 * | 11/2009 | Dai | ................................ | 345/173 |
| 2010/0060586 A1 * | 3/2010 | Pisula et al. | ................... | 345/169 |
| 2010/0083111 A1 * | 4/2010 | de los Reyes | ................. | 715/702 |
| 2010/0229129 A1 * | 9/2010 | Price et al. | ..................... | 715/863 |
| 2010/0248689 A1 * | 9/2010 | Teng et al. | ..................... | 455/411 |
| 2010/0285881 A1 * | 11/2010 | Bilow | .............................. | 463/37 |
| 2010/0306693 A1 * | 12/2010 | Brinda | .......................... | 715/784 |

FOREIGN PATENT DOCUMENTS

WO   WO-2009/004435 A2   1/2009

* cited by examiner

*Primary Examiner* — Amare Mengistu
*Assistant Examiner* — Crystal A Mathews
(74) *Attorney, Agent, or Firm* — Harrington & Smith

(57) ABSTRACT

An apparatus, method, computer program and user interface wherein the apparatus includes a touch sensitive display; and a controller; wherein the apparatus has a restricted mode of operation in which user access to at least some functions of the apparatus is prevented and the touch sensitive display is configured to detect a user input while the apparatus is in the restricted mode of operation wherein the user input comprises actuation of a plurality of points of the touch sensitive display; and the controller is configured, in response to the detection of the user input including actuation of a plurality of points of the touch sensitive display, to control the apparatus to present information without exiting the restricted mode of operation of the apparatus.

18 Claims, 3 Drawing Sheets

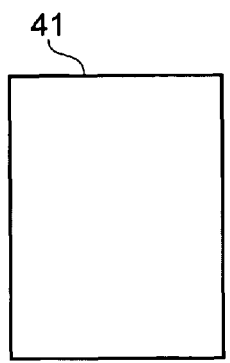
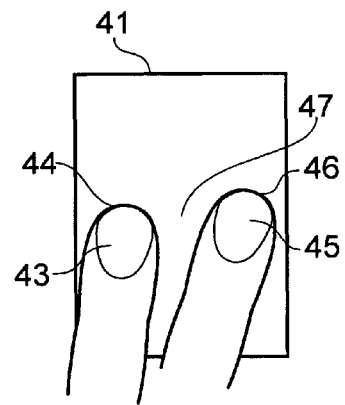
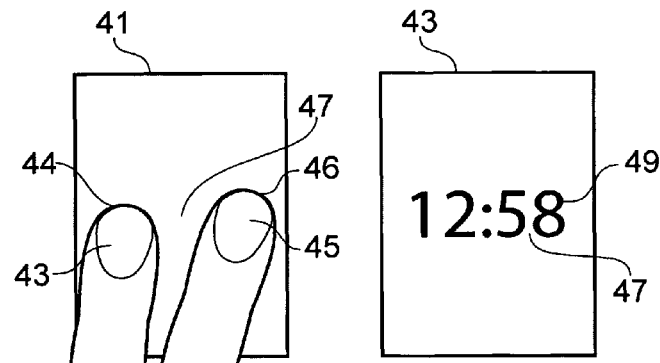
FIG. 3A  FIG. 3B  FIG. 3C
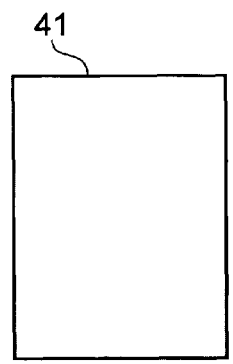
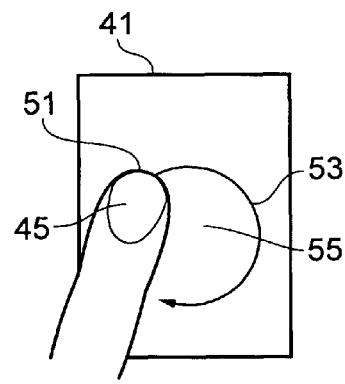
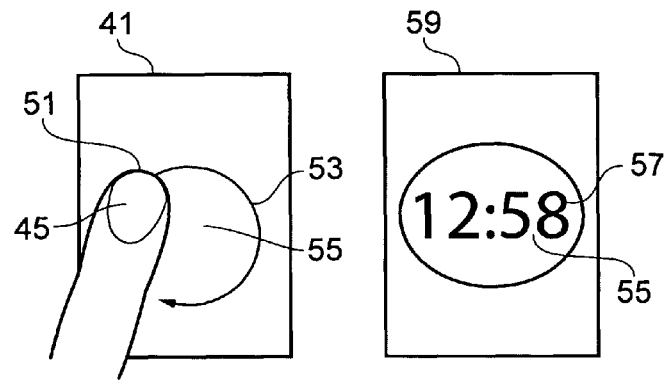
FIG. 4A  FIG. 4B  FIG. 4C

APPARATUS, METHOD, COMPUTER PROGRAM AND USER INTERFACE

FIELD OF THE INVENTION

Embodiments of the present invention relate to an apparatus, method, computer program and user interface. In particular, they relate to an apparatus, method, computer program and user interface wherein the apparatus has a restricted mode of operation.

BACKGROUND TO THE INVENTION

Electronic apparatus commonly have an active mode of operation and an idle mode of operation. In the active mode of operation a user can use a user input to access the functions of the apparatus whereas the idle mode of operation may be a restricted mode of operation where the user input is non-responsive to user actuation thereby preventing user access to functions of the device. For example, in a cellular radio telephone, it is common for a user to be able to lock the user input when the telephone is not in use so that when the telephone is being carried in a pocket or a handbag it cannot perform functions, such as dialing a number unintentionally, but the phone may still receive incoming calls and messages.

A user of such an apparatus may wish to briefly access the functions of the device, for example, they may wish to quickly obtain access to a piece of information stored in the apparatus when the apparatus is in a restricted mode of operation.

BRIEF DESCRIPTION OF VARIOUS EMBODIMENTS OF THE INVENTION

According to various, but not necessarily all, embodiments of the invention there is provided an apparatus comprising: a touch sensitive display; and a controller; wherein the apparatus has a restricted mode of operation in which user access to at least some functions of the apparatus is prevented and the touch sensitive display is configured to detect a user input while the apparatus is in the restricted mode of operation wherein the user input comprises actuation of a plurality of points of the touch sensitive display; and the controller is configured, in response to the detection of the user input comprising actuation of a plurality of points of the touch sensitive display, to control the apparatus to present information without exiting the restricted mode of operation of the apparatus.

In some embodiments of the invention the user input may comprise simultaneous actuation of a plurality of points of the touch sensitive display. In some embodiments of the invention the user input may comprise a trace input.

In some embodiments of the invention the controller may be configured to control the touch sensitive display to present information in a region of the touch sensitive display between the points which are actuated by the user input. In some embodiments of the invention the controller may be configured to determine an orientation of the apparatus and control the touch sensitive display to present the information in a corresponding orientation.

In some embodiments of the invention the information presented on the display in response to the user input might not be presented on the touch sensitive display before the user input is detected. In some embodiments of the invention there might be no information presented on the touch sensitive display before the user input is detected.

In some embodiments of the invention the controller may control the touch sensitive display to present the information for a predetermined amount of time.

In some embodiments of the invention the touch sensitive display may be configured to detect a user input which comprises actuation of any point of the touch sensitive display.

In some embodiments of the invention the touch sensitive display may be configured to detect a first type of user input and a second type of user input and the controller may be configured to present a first type of information in response to detection of the first type of user input and to present a second type of information in response to detection of the second type of user input.

According to various, but not necessarily all, embodiments of the invention there is provided a method comprising: configuring an apparatus in a restricted mode of operation in which user access to at least some functions of the apparatus is prevented; detecting a user input on a touch sensitive display of the apparatus wherein the user input comprises actuation of a plurality of points of the touch sensitive display; and presenting, in response to the detection of the user input, information without exiting the restricted mode of operation of the apparatus.

In some embodiments of the invention the user input may comprise simultaneous actuation of a plurality of points of the touch sensitive display.

In some embodiments of the invention the user input may comprise a trace input.

In some embodiments of the invention the information may be presented in a region of the touch sensitive display between the points which are actuated by the user input.

In some embodiments of the invention the method may comprise determining an orientation of the apparatus and controlling the touch sensitive display to present the information in a corresponding orientation.

In some embodiments of the invention, as described in the preceding paragraphs, the information presented on the display in response to the user input might not be presented on the touch sensitive display before the user input is detected.

In some embodiments of the invention there might be no information presented on the touch sensitive display before the user input is detected.

In some embodiments of the invention the information may be presented on the touch sensitive display for a predetermined amount of time.

In some embodiments of the invention the user input may comprise actuation of any point of the touch sensitive display.

In some embodiments of the invention the method may comprise detecting a first type of user input and, in response to detection of the first type of user input, presenting a first type of information and detecting a second type of user input and, in response to detection of the second type of user input, presenting a second type of information.

According to various, but not necessarily all, embodiments of the invention there is provided a computer program comprising computer program instruction means configured to control an apparatus, the apparatus having a restricted mode of operation in which user access to at least some functions of the apparatus is prevented and the apparatus comprises a touch sensitive display and a controller the program instructions providing, when loaded into a controller; means for detecting a user input on the touch sensitive display, when the apparatus is in the restricted mode of operation, wherein the user input comprises actuation of a plurality of points of the touch sensitive display; and means for presenting, in response to the detection of the user input, information without exiting the restricted mode of operation of the apparatus.

In some embodiments of the invention there may be provided a computer program comprising program instructions for causing a computer to perform the method of any of the above paragraphs.

In some embodiments of the invention there may be provided a physical entity embodying the computer program as described above.

In some embodiments of the invention there may be provided an electromagnetic carrier signal carrying the computer program as described above.

According to various, but not necessarily all, embodiments of the invention there is provided a user interface comprising: a touch sensitive display: wherein the touch sensitive display is configured to detect a user input, when an apparatus is in a restricted mode of operation in which user access to at least some of the functions of the apparatus is prevented, wherein the user input comprises actuation of a plurality of points of the touch sensitive display, and in response to the detection of the user input, information is presented without exiting the restricted mode of operation of the apparatus.

In some embodiments of the invention the user input may comprise simultaneous actuation of a plurality of points of the touch sensitive display.

In some embodiments of the invention the user input may comprise a trace input.

The apparatus may be for wireless communication.

BRIEF DESCRIPTION OF THE DRAWINGS

For a better understanding of various examples of embodiments of the present invention reference will now be made by way of example only to the accompanying drawings in which:

FIGS. 3A to 3C illustrate an embodiment of the invention in use; and

FIGS. 4A to 4C illustrate another embodiment of the invention in use.

DETAILED DESCRIPTION OF VARIOUS EMBODIMENTS OF THE INVENTION

The Figures illustrate an apparatus 1 comprising: a touch sensitive display 15; and a controller 4; wherein the apparatus 1 has a restricted mode of operation in which user access to at least some functions of the apparatus 1 is prevented and the touch sensitive display 15 is configured to detect a user input while the apparatus 1 is in the restricted mode of operation wherein the user input comprises actuation of a plurality of points of the touch sensitive display 15; and the controller 4 is configured, in response to the detection of the user input comprising actuation of a plurality of points of the touch sensitive display 15, to control the apparatus 1 to present information without exiting the restricted mode of operation of the apparatus 1.

Figure 1:
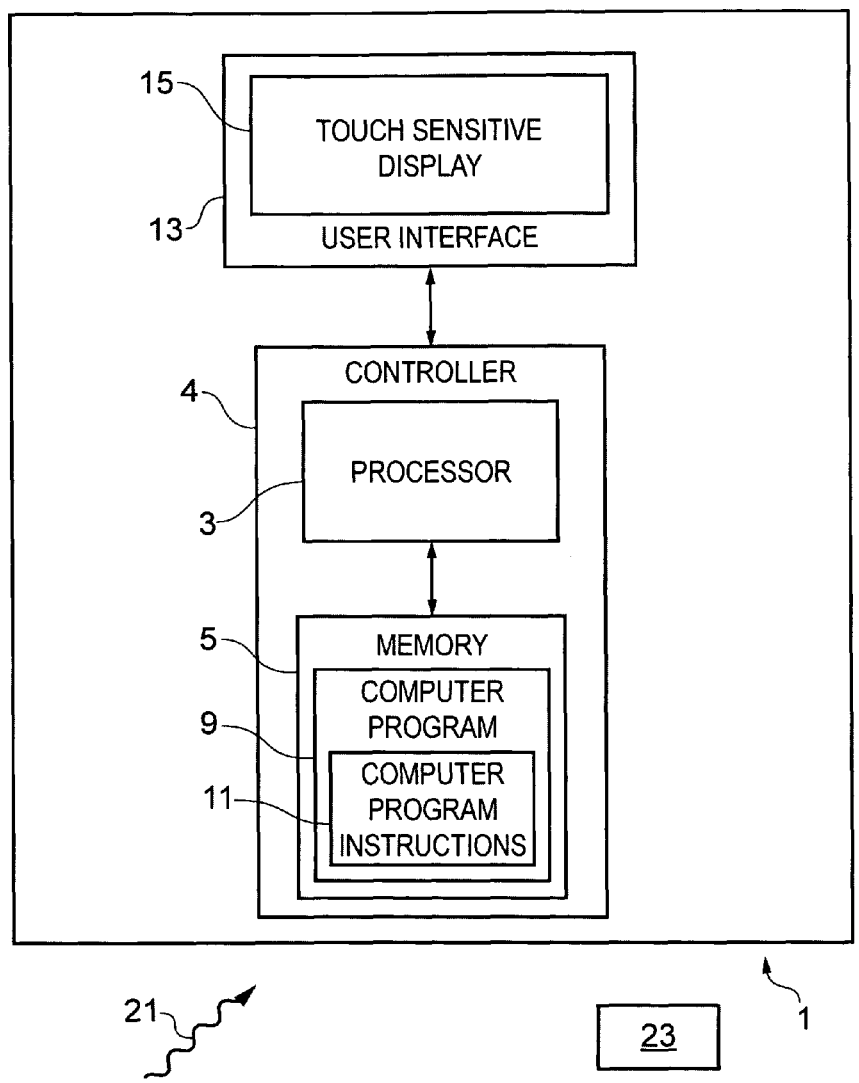
FIG. 1 schematically illustrates an apparatus according to an embodiment of the invention.

FIG. 1 schematically illustrates an apparatus 1 according to an embodiment of the invention. The apparatus 1 may be an electronic apparatus. The apparatus 1 may be, for example, a mobile cellular telephone, a personal computer, a camera, a personal digital assistant, a music player, a navigation device or any other apparatus that may have an active mode of operation and a restricted mode of operation. The apparatus 1 may be a handheld apparatus 1 which can be carried in a user's hand, handbag or jacket pocket for example.

Only features referred to in the following description are illustrated. It should, however, be understood that the apparatus 1 may comprise additional features that are not illustrated. For example, in embodiments of the invention where the apparatus 1 is a mobile cellular telephone, the apparatus 1 may also comprise a transmitter and receiver configured to enable wireless communication.

The illustrated apparatus 1 comprises: a user interface 13 and a controller 4. In the illustrated embodiment the controller 4 comprises a processor 3 and a memory 5 and the user interface 13 comprises a touch sensitive display 15. The user interface 13 provides means for enabling a user to make inputs which may be used to control the apparatus 1.

The controller 4 provides means for controlling the apparatus 1. The controller 4 may be implemented using instructions that enable hardware functionality, for example, by using executable computer program instructions 11 in a general-purpose or special-purpose processor 3 that may be stored on a computer readable storage medium 23 (e.g. disk, memory etc) to be executed by such a processor 3.

The controller 4 may be configured to control the apparatus 1 to perform a plurality of different functions. For example, where the apparatus 1 is a mobile cellular telephone the controller 4 may be configured to control the apparatus 1 to make and receive telephone calls and also to perform other functions such as send messages or access communication networks such as local area networks or the internet.

The controller 4 may also be configured to enable the apparatus 1 to switch between an active mode of operation and a restricted mode of operation. In the active mode of operation the functions of the apparatus 1 may be accessed via the touch sensitive display 15. In the restricted mode of operation the touch sensitive display 15 may be non-responsive to user actuation to prevent user access to functions of the apparatus 1. The restricted mode of operation may be a low power mode of operation in which the amount of power consumed by the apparatus 1 is reduced. For example the power may be reduced by disabling the backlighting or illumination of the touch sensitive display 15.

The processor 3 is configured to receive input commands from the user interface 13 and also to provide output commands to the user interface 13. The processor 3 is also configured to write to and read from the memory 5.

The touch sensitive display 15 is configured to enable information to be displayed to a user of the apparatus 1. The information may comprise items such as text, images or user selectable icons. The touch sensitive display 15 may also be configured to display graphical user interfaces 41, 43, 59 such as those illustrated in FIGS. 3A to 3C and FIGS. 4A to 4C.

The touch sensitive display 15 is configured to detect touch inputs. A user of the apparatus 1 may make a touch input by actuating the surface of the touch sensitive display 15. The surface of the touch sensitive display 15 may be actuated by a user using their finger 43, 45 or thumb or any other suitable object such as a stylus to physically make contact with the surface. In some embodiments of the invention the user may also be able to actuate the touch sensitive display 15 by bringing their finger 43, 45, thumb or stylus close to the surface of the touch sensitive display 15.

The touch sensitive display 15 may be configured to detect different types of user input. For example the touch sensitive display 15 may be configured to detect multi-touch inputs and trace inputs and any other type of actuation or combination or sequence of actuations.

A user may make a multi-touch input by simultaneously actuating a plurality of different points of the touch sensitive display 15 with a plurality of different fingers 43, 45. A user may make a trace input by actuating the surface of the touch sensitive display 15 and then dragging their finger 43, 45, thumb or stylus across the surface.

The output of the touch sensitive display 15 is provided as an input to the controller 4 and is dependent upon the type of actuation of the touch sensitive user input device 17. Different types of input may enable different functions to be performed. The controller 4 may be configured to determine the type of input which has been made and enable the appropriate function to be performed in response to the detected input.

In some embodiments of the invention the user interface 13 may also comprise additional user input devices such as a key pad, a joy stick, or any other user input device which enables a user of the apparatus 1 to input information into the apparatus 1.

The memory 5 stores a computer program 9 comprising computer program instructions 11 that control the operation of the apparatus 1 when loaded into the processor 3. The computer program instructions 11 provide the logic and routines that enables the apparatus 1 to perform the method illustrated in FIG. 2. The processor 3 by reading the memory 5 is able to load and execute the computer program 9.

The computer program instructions 11 may provide computer readable program means configured to control the apparatus 1. The program instructions 11 may provide, when loaded into the controller 4; means for detecting a user input on the touch sensitive display 15, when the apparatus 1 is in the restricted mode of operation, wherein the user input comprises actuation of a plurality of points of the touch sensitive display 15. The program instructions 11 may also provide means for presenting, in response to the detection of the user input, information without exiting the restricted mode of operation of the apparatus 1.

The computer program 9 may arrive at the apparatus 1 via any suitable delivery mechanism 21. The delivery mechanism 21 may be, for example, a computer-readable storage medium, a computer program product 23, a memory device, a record medium such as a CD-ROM or DVD, an article of manufacture that tangibly embodies the computer program 9. The delivery mechanism may be a signal configured to reliably transfer the computer program 9. The apparatus 1 may propagate or transmit the computer program 9 as a computer data signal.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application integration specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 2:
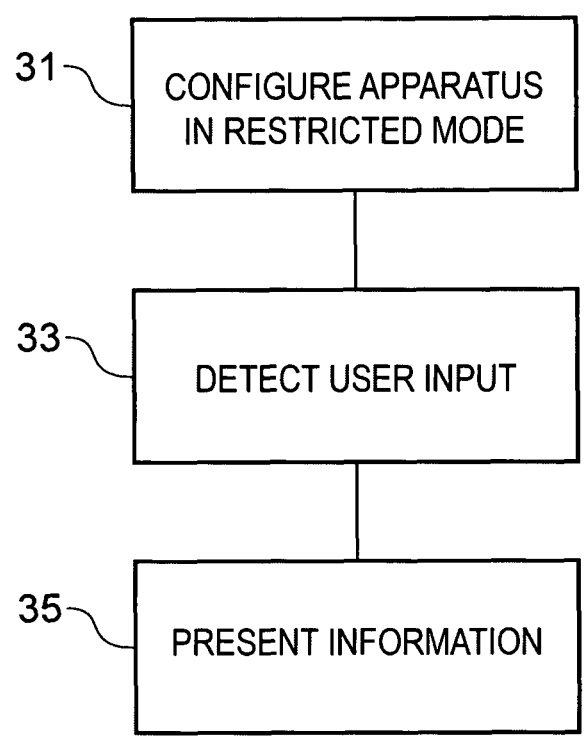
FIG. 2 is a block diagram which schematically illustrates a method according to an embodiment of the invention.

A method of controlling the apparatus 1, according to embodiments of the invention, is illustrated schematically in FIG. 2.

At block 31 the apparatus 1 is configured in a restricted mode of operation. In the restricted mode of operation the touch sensitive display 15 may be non-responsive to user inputs so that access to some or all of the functions of the apparatus 1 is prevented. In some embodiments of the invention the user may still be able to use the touch sensitive display 15 to access limited functions of the apparatus 1 while the apparatus is in the restricted mode of operation. For example the user may be able to use the touch sensitive display 15 to exit the restricted mode of operation or in embodiments of the invention where the apparatus 1 is a telephone the user may still be able to use the touch sensitive display 15 to make an emergency telephone call.

When the apparatus 1 is in the restricted mode the touch sensitive display 15 may be configured so that no information is presented on the display 15. In some embodiments of the invention a limited amount of information may be presented on the display while the apparatus is in the restricted mode. For example an icon may be presented indicating that the apparatus 1 is in the restricted mode.

The restricted mode of operation may be a low power mode of operation. For example the back lighting and illumination of the touch sensitive display 15 may be disabled in order to conserve power. In embodiments of the invention where the user interface 13 comprises an additional user input such as a keypad any backlighting or illumination of the keypad may also be disabled in order to enable power to be conserved.

A user may wish to configure the apparatus in a restricted mode of operation to avoid inadvertently accessing functions of the apparatus 1 or to conserve the power in the apparatus 1. For example, while the apparatus 1 is in a restricted mode of operation the apparatus 1 will not respond to unintentional actuations of the touch sensitive display which may occur while the user is carrying the apparatus 1 in their pocket or handbag.

The apparatus 1 may be configured to enter the restricted mode of operation in response to detection of a user input. For example the user may make a user input or a sequence of user inputs and in response to the detection of these user inputs the controller 4 may control the apparatus 1 to enter the restricted mode of operation. In some embodiments of the invention the restricted mode of operation may be a default mode of operation of the apparatus 1 so that the apparatus 1 may automatically enter the restricted mode after a function being carried out by the apparatus 1 has been completed. For example, where the apparatus 1 is a mobile cellular telephone a user may end a telephone call by actuating the touch sensitive display 15. In response to this user input the apparatus 1 may be configured to terminate the telephone call and automatically enter the restricted mode of operation without any further user input.

The apparatus 1 may be configured so that the apparatus 1 may exit the restricted mode of operation in response to a user input. For example, a user may be able to make a particular input or a sequence of inputs on the touch sensitive display 15 and in response to the user input the apparatus 1 may exit the restricted mode of operation. The user input required to exit the restricted mode of operation may last for a predetermined amount of time or require a particular sequence of inputs to avoid unintentionally exiting the restricted mode of operation. Once the user has exited the restricted mode of operation the apparatus is configured in an active mode of operation and a user may be able to access all of the functions of the apparatus 1.

At block 33 the touch sensitive display 33 detects a user input. The user input may actuate a plurality of different points of the touch sensitive display 15. The user input may comprise actuation of a plurality of different points of the touch sensitive display 15 in a way which is unlikely to be replicated unintentionally. For example, the touch sensitive display 15 may be actuated in a way which is unlikely to be caused by accidentally knocking the apparatus 1 while it is being carried.

In some embodiments of the invention the user input may be a multi-touch input in which the user actuates a plurality of different points of the apparatus simultaneously. A user may make a multi-touch input by using two or more fingers 43, 45 to actuate the touch sensitive display 15 at the same time.

In some embodiments of the invention the user input may be trace input in which a plurality of different points of the touch sensitive display 15 are actuated sequentially. A user may make a trace input by actuating the surface of the touch sensitive display 15 and then dragging their finger 43, 45, thumb or stylus across the surface. In some embodiments of the invention the trace input may have a particular shape. For example, the trace input may form a closed loop which starts and ends substantially on the same point of the touch sensitive display 15. In other embodiments of the invention the trace input may make a shape such as a letter or a number on the surface of the touch sensitive display 15.

In some embodiments of the invention the user input may comprise a combination of user inputs. For example, the user input may comprise both a multi-touch input and a trace input. The user may actuate the touch sensitive user display 15 with a plurality of fingers 43, 45 at the same time and then drag the plurality of fingers 43, 45 across the surface of the touch sensitive display 15.

The plurality of points actuated by the user input may define a region 47, 55 of the touch sensitive display 15. The plurality of points actuated by the user may define at least a portion of the boundary of the region 47, 55. For example, where the user input is a trace which forms a closed loop or a substantially closed loop the region 55 defined by the user input may be the region 55 enclosed by the trace. In embodiments of the invention where the input is a multi-touch input the region 47 defined by the user input may comprise the region 47 of the touch sensitive display 15 between the points actuated by the user input.

In some embodiments of the invention the user input may be made on any point of the touch sensitive display 15 so that any point of the touch sensitive display 15 may be actuated.

At block 35, in response to the detection of the user input the controller 4 controls the apparatus 1 to present information without exiting the restricted mode of operation. The controller may control the apparatus 1 to present information by controlling the touch sensitive display 15 to display the information.

As the apparatus 1 is still in the restricted mode of operation, although information is being presented, the touch sensitive display 15 is still non-responsive to other user inputs so that access to the functions of the apparatus 1 is still prevented.

The apparatus 1 may remain in a low power mode of operation, for example, the illumination of the touch sensitive display 15 may remain inactivated. In some embodiments of the invention only the region of the touch sensitive display 15 in which information is displayed maybe illuminated in order to reduce power consumption but enable the information to be clearly visible.

The information presented may comprise information such as the time. In some embodiments of the invention the information presented may comprise information relating to functions of the apparatus 1. For example, in embodiments of the invention where the apparatus 1 is a mobile cellular telephone the information may comprise information indicating that a message has been received or that an incoming call has been missed or information relating to information stored in the apparatus 1 such as a calendar event.

In some embodiments of the invention the touch sensitive display 15 may be configured to detect different types of user input and the controller 4 may be configured to control the apparatus 1 to present different types of information depending on the input detected. For example in response to a first type of user input the controller 4 may control the apparatus 1 to present the time. In response to a second type of user input the controller may control the apparatus to present information relating to missed calls or received messages. In some embodiments of the invention the controller 4 may control the apparatus 1 to present the plurality of different types of information simultaneously.

In some embodiments of the invention the controller 4 may control the touch sensitive display 15 to present the information in a region 47, 55 of the touch sensitive display 15 defined by the user input. For example where the user input was a multi-touch user input the information may be presented in the region 47 of the display between the points actuated in the user input. Where the user input comprises a trace which forms a closed loop or a substantially closed loop the information may be presented in the region 55 enclosed by the trace. In such embodiments of the invention the magnitude of the information presented on the touch sensitive display 15 may depend upon the size of the region 47, 55 defined by the user input. For, example the size of the alphanumeric characters and symbols of the information may be controlled to fit within the region 47, 55. A user may be able to increase the size of the alphanumeric characters and symbols by defining a larger region 47, 55 with the user input.

In some embodiments of the invention the controller 4 may be configured to determine an orientation of the apparatus 1. The controller 4 may determine an orientation of the apparatus 1 by using the detected user input. For example the controller 4 may determine the orientation of the apparatus 1 from the direction in which a trace is carried out. Once the orientation of the apparatus 1 has been determined the information may be displayed on the touch sensitive display 15 in a corresponding orientation. This enables the information to always be displayed in an orientation which is convenient for the user of the apparatus 1.

The information may be displayed on the touch sensitive display 15 for a predetermined amount of time. For example the information may be presented on the display for a specific time period after the user input has been completed. In some embodiments of the invention the length of time for which the information is displayed on the display may be dependent on the user input which has been detected.

In other embodiments of the invention the information may be presented while the user is making the input. For example, where the user input is a multi-touch input the user may maintain contact with the surface of the touch sensitive display 15 and the information may be presented on the touch sensitive display 15 between the user's fingers 43, 45. When the user ends the input by taking their fingers 43, 45 of the touch sensitive display 15 the information may also be removed from the touch sensitive display 15.

The blocks illustrated in FIG. 2 may represent steps in a method and/or sections of code in the computer program 9. The illustration of a particular order to the blocks does not necessarily imply that there is a required or preferred order for the blocks and the order and arrangement of the block may be varied. Furthermore, it may be possible for some steps to be omitted.

Embodiments of the invention provide the advantage that a user can quickly and easily access information without exiting a restricted mode of operation of the apparatus. This is more convenient for a user as they do not have to exit the restricted mode of operation to view the information. It may also reduce power consumption as a user does not have to access an active mode of operation just to view the information.

The user input used to access the information may be quick and simple for the user to make but is unlikely to be replicated unintentionally which avoids the information being accessed inadvertently.

Also different types of information may be presented in response to the user input. This enables embodiments of the invention to be used to quickly access a plurality of different types of information without having to exit the restricted mode of operation.

FIGS. 3A to 3C illustrate an embodiment of the invention in use.

FIG. 3A illustrates a graphical user interface 41 which is displayed on the touch sensitive display 15 when the apparatus 1 is in the restricted mode of operation. In the illustrated embodiment no information is displayed on the touch sensitive display 15 while the apparatus is in the restricted mode. Also any backlighting or illumination of the touch sensitive display 15 may be disabled in order to conserve power.

In FIG. 3B a user actuates the touch sensitive display 15. In FIG. 3B the user makes a multi-touch input by simultaneously actuating a first point 44 of the touch sensitive display 15 with a first finger 43 and a second point 46 of the touch sensitive display 15 with a second finger 45. The first point 44 and the second point 46 are separated by a region 47 of the touch sensitive display 15. It is to be appreciated that in embodiments of the invention the first point 44 and the second point 46 may be any points on the touch sensitive display 15.

In FIG. 3C the controller 4 has detected the user input and has now controlled the apparatus to present information 49. The controller 4 has controlled the touch sensitive display 15 to replace the user interface illustrated in FIG. 3A with the user interface illustrated in FIG. 3C.

In the embodiment illustrated in FIG. 3C the information 49 comprises the time. The information 49 is displayed in the region 47 of the touch sensitive display 15 between the first point 44 and the second point 46 which were actuated in the user input. By displaying the information 49 in the region between the points actuated during the user input this ensures that the information 49 is not obscured by the user's fingers. For example if the user keeps their fingers 43, 45 on the touch sensitive display 15 while the information 49 is displayed the information is still visible to the user because it is not hidden by their fingers 43, 45.

FIGS. 4A to 4C illustrate another embodiment of the invention in use.

FIG. 4A illustrates a graphical user interface 41 which is the same as the graphical user interface 41 illustrated in FIG. 3A and is displayed on the touch sensitive display 15 when the apparatus 1 is in the restricted mode of operation.

In FIG. 4B a user actuates the touch sensitive display 15. In FIG. 4B the user makes a user input by making a trace input by dragging their finger 45 across the surface of the touch sensitive display 15.

In the embodiment illustrated in FIG. 4B the user makes the trace input by actuating a first point 51 on the surface of the touch sensitive display 15 and then dragging their finger 45 across the surface of the touch sensitive display 15 in a substantially circular motion in a clockwise direction indicated by the arrow 53. The user completes the trace input at the first point 51 to form a closed loop. It is to be appreciated that in embodiments of the invention the user need not end the trace on the exact same point which the trace began, however the trace may end within a given distance of the first point so that the trace forms a substantially closed loop.

The trace input defines a region 55 which is enclosed by the trace input.

In FIG. 4C the controller 4 has detected the user input and has now controlled the apparatus to present information 57. The controller 4 has controlled the touch sensitive display 15 to replace the user interface illustrated in FIG. 4A with the user interface illustrated in FIG. 4C.

In the embodiment illustrated in FIG. 4C the information 57 comprises the time. The information 57 is displayed in the region 55 of the touch sensitive display 15 which was enclosed by the trace input.

Although embodiments of the present invention have been described in the preceding paragraphs with reference to various examples, it should be appreciated that modifications to the examples given can be made without departing from the scope of the invention as claimed. For example in the above described embodiments of the invention the information is presented by being displayed on the touch sensitive display 15. In other embodiments of the invention other means of presenting the information may be used, for example the information may be presented as an audio signal.

Also in the above described embodiments the touch sensitive display 15 is a substantially flat display which forms a planar surface. In other embodiments of the invention other types of display may be used. For example, the touch sensitive display 15 may extend over a plurality of the outer surfaces of the apparatus 1 so that the touch sensitive display 15 comprises a plurality of surfaces.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a touch sensitive display; and
   a controller;
   wherein the apparatus has a restricted mode of operation in which user access to at least some functions of the apparatus is prevented by a non-responsiveness of the touch sensitive display and the touch sensitive display is configured to detect a multi-touch user input while the apparatus is in the restricted mode of operation wherein the multi-touch user input comprises actuation of a plurality of points of the touch sensitive display; and
   the controller is configured, in response to the detection of the multi-touch user input comprising actuation of a plurality of points of the touch sensitive display, to control the apparatus to present information without exiting the restricted mode of operation of the apparatus;

wherein the controller is further configured to control the touch sensitive display to present information in a region of the touch sensitive display between the points which are actuated by the multi-touch user input; and wherein the user input comprises simultaneous actuation of a plurality of points of the touch sensitive display.

2. An apparatus as claimed in claim 1 wherein the user input comprises a trace input.

3. An apparatus as claimed in claim 1 wherein the controller is configured to determine an orientation of the apparatus and control the touch sensitive display to present the information in a corresponding orientation.

4. An apparatus as claimed in claim 1 wherein the information presented on the display in response to the user input is not presented on the touch sensitive display before the user input is detected.

5. An apparatus as claimed in claim 4 wherein no information is presented on the touch sensitive display before the user input is detected.

6. An apparatus as claimed in claim 1 wherein the controller controls the touch sensitive display to present the information for a predetermined amount of time.

7. An apparatus as claimed in claim 1 wherein the touch sensitive display is configured to detect a user input which comprises actuation of any point of the touch sensitive display.

8. An apparatus as claimed in claim 1 wherein the touch sensitive display is configured to detect a first type of user input and a second type of user input and the controller is configured to present a first type of information in response to detection of the first type of user input and to present a second type of information in response to detection of the second type of user input.

9. An apparatus as claimed in claim 1, wherein the information presented in the region of the touch sensitive display comprises time.

10. An apparatus as claimed in claim 1, wherein the information presented in the region of the touch sensitive display comprises information relating to functions of the apparatus.

11. A method comprising:
configuring an apparatus in a restricted mode of operation in which user access to at least some functions of the apparatus is prevented by a non-responsiveness of a touch sensitive display;
detecting a multi-touch user input on the touch sensitive display of the apparatus wherein the multi-touch user input comprises actuation of a plurality of points of the touch sensitive display; and
presenting, in response to the detection of the multi-touch user input, information without exiting the restricted mode of operation of the apparatus;
wherein the information is presented in a region of the touch sensitive display between the points which are actuated by the multi-touch user input; and
wherein the user input comprises simultaneous actuation of a plurality of points of the touch sensitive display.

12. A method as claimed in claim 11 wherein the user input comprises a trace input.

13. A method as claimed in claim 11 comprising determining an orientation of the apparatus and controlling the touch sensitive display to present the information in a corresponding orientation.

14. A method as claimed in claim 11 wherein the information presented on the display in response to the user input is not presented on the touch sensitive display before the user input is detected.

15. A method as claimed in claim 11 wherein no information is presented on the touch sensitive display before the user input is detected.

16. A method as claimed claim 11 wherein the user input may comprise actuation of any point of the touch sensitive display.

17. A method as claimed in claim 11 comprising detecting a first type of user input and, in response to detection of the first type of user input, presenting a first type of information and detecting a second type of user input and, in response to detection of the second type of user input, presenting a second type of information.

18. A non-transitory computer readable storage medium tangibly embodying a program of instructions executable to control an apparatus, the apparatus having a restricted mode of operation in which user access to at least some functions of the apparatus is prevented and the apparatus comprises a touch sensitive display and a controller, at least some functions of the apparatus being prevented by a non-responsiveness of the touch sensitive display, the program of instructions enabling, when loaded into the controller:
detecting a multi-touch user input on the touch sensitive display, when the apparatus is in the restricted mode of operation, wherein the multi-touch user input comprises actuation of a plurality of points of the touch sensitive display; and
presenting, in response to the detection of the multi-touch user input, information without exiting the restricted mode of operation of the apparatus;
wherein the information is presented in a region of the touch sensitive display between the points which are actuated by the multi-touch user input; and
wherein the user input comprises simultaneous actuation of a plurality of points of the touch sensitive display.

* * * * *